3,259,607
PREPARATION OF HIGH MOLECULAR WEIGHT POLYESTERS

Harald H. O. Cherdron, Ittenbach (Rhine), Hans H. Ohse, Oberdollendorf (Rhine), and Friedrich W. A. G. K. Korte, Hangelar uber Siegburg, Germany, assignors to Shell Oil Company, New York, N.Y., a corporation of Delaware
No Drawing. Filed Mar. 25, 1963, Ser. No. 267,853
Claims priority, application Germany, Mar. 30, 1962, S 78,764
12 Claims. (Cl. 260—78.3)

The invention relates to a process for the preparation of polyesters of high molecular weight from lactones and to the novel polymers produced thereby.

It has been known that lactones polymerize to polyesters of generally less than ten monomer units, often merely upon standing at room temperature. The state of the art in 1932 is excellently summarized, and additional work reported, by Carothers et al., J.A.C.S. 54, 761 (1932). The authors report, i.a., the conversion of δ-valerolactone to waxy solids having molecular weights in the range from 1,000 to 2,500. A few additional studies on homopolymerization of lactones have been sporadically reported since that time. The production of lactone homopolymers of high molecular weights, e.g., of 15,000 and higher, appears to be an unsolved problem to date.

We have now found that, surprisingly, linear crystalline polyester polymers of lactones having 3, 5 or 6 carbon atoms in the lactone ring may be produced whose molecular weights range from 15,000 to 200,000 or more. From our findings it appears that the factor which has heretofore prevented the production of such high molecular weight polylactones is probably the presence of trace amounts of impurities in the monomer.

According to our invention, high-molecular weight polymers and copolymers of lactones are obtained in very good yields when highly purified lactones, specifically those having three and those having at least five carbon atoms in the ring, are contacted with organic aluminum compounds which contain at least one aluminum-carbon bond, in the presence of a controlled small amount of water, sufficient to act as a co-initiator.

Aluminum compounds suitable for use as initiator include those of formulas $AlR_3$, $AlR_2X$, $AlRX_2$, $Al_2R_3X_3$, $AlR_2(OR')$, $AlR(OR')_2$, and, less preferably, $AlR_2H$, wherein each R and R' is a saturated hydrocarbyl group, e.g., alkyl, cycloalkyl, aryl, or hydrocarbon substituted alkyl, cycloalkyl or aryl, preferably of 1 to 12 carbon atoms, and each X is a halogen atom. A single compound may contain different hydrocarbyl groups bound to Al. It is particularly preferred to employ compounds in which X is chlorine and in which each R is an alkyl group. Suitable compounds include aluminum trimethyl, aluminum triisobutyl, aluminum triphenyl, aluminum diisobutyl chloride, aluminum diethyl bromide and iodide, aluminum ethyl sesquichloride, aluminum monoethyl dichloride, aluminum diisopropyl monoisopropoxide and diisobutyl aluminum hydride. Other compounds will be obvious from the above description. It will be understood that these compounds cannot be substituted for each other with identical results. For example, it has been found that use of aluminum compounds having a relatively high ratio of halogen to aluminum results in increased conversion to polymer of lower molecular weight, compared with aluminum compounds of lower halogen to aluminum ratios. Also, as explained below, the appropriate portion of water as co-initiator differs with different aluminum-organic compounds. Most preferred for use in this invention are those compounds in which each R is an ethyl group, and particularly aluminum triethyl and aluminum diethyl chloride.

It is advantageous to use the aluminum compound in concentrations from $10^{-1}$ to $10^{-6}$, preferably from $10^{-1}$ to $10^{-3}$ mol of initiator per mol of monomeric lactone.

The presence of a controlled amount of water as co-initiator is required. It is probable that the initiator is present in the polymerization mixture as a complex compound with monomers and water, but this invention is not to be limited by any hypothesis of its mechanism.

The amount of water used according to the invention is preferably not in excess of 1 mol per mol of initiator although up to 2 mols may be effective in some cases. The optimum amount varies from case to case. In the polymerization of β-propiolactone, for example, it was found that with the use of aluminum diethyl monochloride an initiator, between ¼ and ½ mol, and most suitably about ⅓ mol of water is employed as co-initiator. With the use of aluminum triethyl as initiator the optimum amount of water as co-initiator is between ⅖ and 1 mol, most suitably ½ to ⅔ mol of water per mol of the aluminum compound. With aluminum diethyl ethoxide, the preferred ratio is about ½ and with aluminum monoethyl dichloride about ⅙. These ratios are also preferred for use with other effective compounds of the type $AlR_2Cl$ and $AlR_3$, $AlR_2(OR)$, and $AlRCl_2$, respectively, and are generally suitable in polymerizations according to this invention.

The monomers which are polymerized according to this invention are lactones having 3 carbon atoms in the ring and lactones having 5, 6 or more carbon atoms in the ring, and free of groups or substituents capable of undergoing polymerization in the presence of aluminum-organic compounds and water, or if interfering with polymerization through the lactone linkage; e.g., the monomers should be free of olefinic double bonds. Preferred feeds are β-propiolactone, δ-valerolactone and ε-caprolactone. Mixtures of suitable monomers may be copolymerized according to this invention. It has hitherto not been possible to effectively polymerize γ-butyrolactone according to the process of this invention.

It is essential that feeds to the process of this invention be of extremely high purity, as will be described in more detail below.

The liberation of the lactones from substances which interfere with the ionic polymerization, for instance from acid or basic compounds, as well as from water, may be effected by subjecting the lactone, previously purified by fractional distillation, to another fractional distillation treatment with the addition of suitable substances which bind water as well as acids or bases, for example, polyphosphoric acid, calcium hydride, or organic isocyanates.

Molecular sieves, ion exchangers, silica gel and the like may be used for the purification or partial purification of the lactone. In many cases, two or more purifying treatments are suitably carried out in series, each with the use of a different agent.

The degree of purity may be checked by gas-liquid chromatography. A suitable column packing consists of di-n-decylphthalate, silicone-oil, silicone-grease, or polyethylene glycol as stationary phase, supported on ground firebrick of .2–.3 mm. particle size. With helium as carrier gas and a gas flow of 50 ml./min., at 175° C., retention times are 4 minutes for β-propiolactone (B.P.$_{20\,mm.}$=62° C.); 21 minutes for δ-valerolactone (B.P.$_{10\,mm.}$=105–107° C.); and 27 minutes for ε-caprolactone (B.P.$_{0.02\,mm.}$=76–78° C.).

It is generally preferred to purify the monomeric lactone to a high degree, for example as described above, so that it contains less than 0.1 mol percent of water, preferably less than 0.01 mol percent, and most preferably no measurable amount of water, and thereafter add a predetermined quantity of water to act as co-initiator.

A useful test for monomer purity is the storage stability of the monomer. For example, distilled δ-valerolactone was found to be converted to polymer within a few hours of distillation when stored, no initiator having been added. Redistillation in the presence of phenylisocyanate resulted in δ-valerolactone of sufficient purity for use in this invention; it did not polymerize spontaneously when stored 14 days at 100° C.

In the process according to the invention, polymerization may be effected in solution, suspension or in bulk. Suitable solvents are, for example, dioxane, tetrahydrofuran, nitrobenzene, and glycol dimethyl ether. Aromatics, e.g., toluene, are suitable for lactones having 5 or more carbon atoms in the lactone ring. A 10–20% solution of a lactone in one of said solvents is a suitable polymerization feed, but any other concentrations may also be used in the process according to the invention. It is also possible to employ suspension polymerization, e.g., in n-hexane.

The solvents or diluents require careful drying and purification; the same methods may be employed as in purifying the monomers. The polymerization vessels should be thoroughly clean and dry. It is generally advantageous to exclude oxygen.

The polymerization reactions of this invention may be carried out effectively over a broad range of conditions. Reaction temperatures may range from room temperature to 100° C. and times from 1 hour or less to more than 50 hours, the shorter times being employed at the higher temperatures. Times from 12 to 50 hours or more may be used at room temperature. Subatmospheric and superatmospheric pressures may be employed.

The high-molecular weight polymers obtained by the process according to the invention are solid, crystalline polyesters, with melting points generally in the range from 50° to 100° C. They may be used as lacquer raw materials, worked up to films or fibers, or may be used as components in polymer mixtures to impart desirable properties.

According to the process of the invention polymers can be obtained having a number average molecular weight above 15,000, in many instances above 20,000 and in some instances up to 200,000. Although measurement usually is expressed in terms of intrinsic viscosity (dl./g.), it is possible in the case of δ-valerolactone to calculate the molecular weights by a calibration curve which is based on end-group determination. An intrinsic viscosity of 0.2 dl./g. (determined in benzene at 20° C.) is found to correspond to a molecular weight of about 20,000.

Typical poly(β-propiolactones) are substantially linear polymers in which the repeating unit is

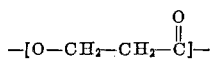

They melt at 70°–100° C., are soluble in chloroform and formic acid and generally in methylene chloride, dioxane, dimethylsulfoxide, and glacial acetic acid, and are insoluble in diethyl ether.

Typical poly(δ-valerolactones) are substantially linear polymers in which the repeating unit is

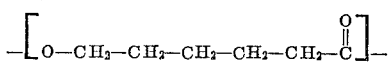

They melt at 50°–60° C., are soluble in aromatic hydrocarbons, e.g., benzene and toluene, as well as in solvents for poly-β-propiolactones, and are insoluble in diethyl ether.

Typical poly(ε-caprolactones) are substantially linear polymers in which the repeating unit is

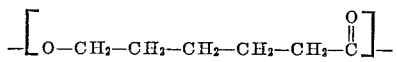

Their melting points and solubilities are like those of poly(δ-valerolactones).

In their original state, all these polymers are white, flocky or fibrous, odorless materials, generally having number average molecular weights above 15,000. X-ray diffraction patterns show them to be crystalline. They appear to contain one hydroxyl end group and one carboxyl end group per polymer molecule.

The infrared absorption spectra of δ-valerolactone polymers of this invention are characterized by a sharp absorption band at 1320 cm$^{-1}$.

The process will be further illustrated by the following examples.

EXAMPLE 1

β-propiolactone which had been subjected to simple distillation was redistilled at 20 mm. pressure with the addition of 2% by weight of toluene diisocyanate (TDI) in a 1.5 m. high, automatically controlled column, packed with Raschig rings. The lactone was taken overhead; TDI remained as bottoms. The fraction with a boiling point of 62° C. (20 mm.) and a refractive index $n_D^{20}=1.4478$ was collected and tested for purity by gas chromatography. With a column packing of silicone grease on firebrick, a temperature of 200° C. and helium as carrier gas the column only showed one peak of β-propiolactone. (Water content: 0.00 mol percent) 5 ml. of the said pure β-propiolactone was placed in a 50 ml. one-necked flask equipped with a side arm for the vacuum and/or nitrogen tube which flask had been preheated in vacuo, after which first the amount of water mentioned in Table 1 below and subsequently a quantity of $1\times10^{-2}$ mol of aluminum diethyl monochloride per mol of lactone were added by means of an injection syringe. Polymerization temperature: 50° C.; polymerization: 72 hours. After the desired time period had elapsed, the polymer solution was dropped into 6–8 volumes of ether and the precipitated flocky to fibrous white polymer collected on a glass frit, washed with ether, and dried in vacuo over calcium chloride.

The conversion and the intrinsic viscosity [η] (measured in chloroform) of the polymers obtained are given in Table 1:

*Table 1*

| Experiment No. | Water | | Conversion, Percent | [η] |
| --- | --- | --- | --- | --- |
| | Percent by wt.[1] | Mol/mol of initiator | | |
| 1 | 0 | 0 | 26.0 | 0.17 |
| 2 | 0.035 | 0.14 | 28.0 | 0.21 |
| 3 | 0.087 | 0.35 | 93.0 | 1.03 |
| 4 | 0.120 | 0.49 | 63.0 | 0.58 |
| 5 | 0.175 | 0.70 | 0 | -------- |

[1] Based on lactone.

Maxima of conversion and molecular weight of polymer were found at about the same ratio of water to initiator when different reaction temperatures in the range from 20° C. to 60° C. were employed.

EXAMPLE 2

δ-valerolactone which had been subjected to simple distillation was fractionally redistilled at reduced pressure in the column described in Example 1, with 5% by weight of phenylisocyanate (PI). The PI distilled first and was recovered. The fraction with a boiling point of 105°–107° C. (10 mm.) and a refractive index of $n_D^{20}=1.4530$ was collected and tested by gas chromatography in a manner similar to that described in Example 1. In addition to a peak attributable to the δ-valerolactone, a small second peak was found. Distillation was therefore repeated with the addition of 3% by weight of calcium hydride. Gas chromatography showed the redistilled product to be pure. As described in Example 1, the amounts of water mentioned in the table and $1 \times 10^{-2}$ mol of aluminum triethyl per mol of lactone were added to 5 ml. of this pure δ-valerolactone. Polymerization time: 21 hours; polymerization temperature: 50° C. The conversion and η (measured in benzene) are given in Table 2.

Table 2

| Experiment No. | Water | | Conversion percent | [η] | Mn |
|---|---|---|---|---|---|
| | Percent by wt.[1] | Mol/mol of initiator | | | |
| 6 | 0 | 0 | 60.7 | 0.32 | 38,000 |
| 7 | 0.035 | 0.14 | 61.0 | 0.32 | 38,000 |
| 8 | 0.087 | 0.35 | 62.5 | 0.35 | 52,000 |
| 9 | 0.120 | 0.49 | 60.1 | 0.44 | 100,000 |
| 10 | 0.175 | 0.70 | 75.0 | 0.42 | 83,000 |
| 11 | 0.220 | 0.84 | 72.0 | 0.40 | 75,000 |
| 12 | 0.260 | 1.11 | 57.5 | 0.37 | 58,000 |
| 13 | 0.350 | 1.39 | 0 | | |

[1] Based on lactone.

EXAMPLE 3

ε-caprolactone, which had been subjected to simple distillation was fractionally redistilled in a column as in Example 1, with the addition of 3% of phenylisocyanate. As in Example 2, it was found that purification was still incomplete, and the lactone was re-fractionated with the addition of 2% of polyphosphoric acid. The product collected at 76°–78° C. (0.02 mm. mercury), had a refractive index of $n_D^{20} = 1.4621$, and was found to be pure, by gas-chromatography as in Example 1. It is suitably polymerized as described in Example 2. Even shorter reaction times, e.g., 3 hours, are effective, and polymers are of especially high molecular weight, generally between 100,000 and 200,000.

EXAMPLE 4

Polymerizations were repeated in the manner of Example 1, but with a reaction time of 21 hours, and with several different aluminum compounds. The following data, in Table 3, reflect the conditions at which percent conversion and molecular weight, respectively, reached their observed maxima.

Table 3

| Experiment No. | Al Compound | Water Mol/mol of initiator | Conversion, percent | [η] |
|---|---|---|---|---|
| 14 | AlEt₃ | 0.68 | 18.0 | 0.95 |
| 15 | AlEt₂Cl | 0.34 | 85.0 | 0.41 |
| 16 | AlEt₂(OEt) | 0.49 | 88.5 | 0.44 |
| 17 | AlEtCl₂ | 0.14 | 32.1 | 0.18 |
| 18 | AlEtCl₂ | 0.34 | 11.2 | 0.86 |

With AlEt₂(OEt) 1.04 mol H₂O/mol Al compound still resulted in a significant amount of polymerization.

EXAMPLE 5

Novel high molecular weight polymers of β-propiolactone were prepared by various different methods and found to have the properties shown in Table 4.

Table 4

| M.P. (° C.) | Reduced Viscosity (in CHCl₃ at 20° C.) dl./g. |
|---|---|
| 75–80 | 0.18 |
| 78–80 | 0.3 |
| 90 | 0.2 |
| 80–85 | 1.0 |
| 98–100 | 0.2 |

EXAMPLE 6

Similarly, polymers of δ-valerolactone were prepared and found to have the properties shown in Table 5.

Table 5

| M.P., ° C. | Mn |
|---|---|
| 56 | 70,000 |
| Not determined | 16,000 |
| | 38,000 |
| | 27,000 |
| | 62,000 |

EXAMPLE 7

A copolymer of β-propiolactone and δ-valerolactone, polymerized in a volume ratio of 7:3, was found to melt at 65–85° C.

EXAMPLE 8

A polymer of ε-caprolactone was found to have a melting point of 56–57° C. and a molecular weight of 20,000.

EXAMPLE 9

A chloroform solution of high molecular weight poly-(δ-valerolactone) similar to those of Example 2 was poured onto a glass plate. Upon evaporation of the chloroform, a thin, tough film of polymer was found to have been formed. Similar films can be formed from polymers of Examples 1 and 3. The films may also be formed on other substrates and can serve as decorative and protective coatings.

EXAMPLE 10

A chloroform solution of poly(δ-valerolactone), as in Example 9, was extruded through a nozzle into methanol, resulting in the production of fibers. Fibers can be similarly formed from the polymers of Examples 1 and 3.

We claim as our invention:

1. A process for the production of high-molecular weight polylactones comprising polymerizing a lactone selected from the group consisting of beta-propiolactone, delta-valerolactone, and epsilon-caprolactone by maintaining it in contact at a temperature in the range from room temperature to 100° C. with $10^{-1}$ to $10^{-6}$ mole per mole of said lactone of a catalyst consisting of an organo-aluminum compound selected from the group consisting of aluminum trialkyls and aluminum alkyl alkoxides wherein the alkyl groups have from 1 to 12 carbon atoms, together with a carefully controlled, catalyst-modifying amount of water in the range from ⅙ to 1 mol per mol of aluminum compound.

2. A process for the production of high-molecular weight polylactones comprising polymerizing a lactone selected from the group consisting of beta-propiolactone, delta-valerolactone, and epsilon-caprolactone by maintaining it in contact at a temperature in the range from room temperature to 100° C. with from $10^{-1}$ to $10^{-6}$ mole per mole of said lactone of a catalyst consisting of an organo-aluminum compound selected from the group consisting of aluminum alkyl halides wherein the alkyl groups have from 1 to 12 carbon atoms, together with a carefully controlled, catalyst-modifying amount of water in the range from ⅙ to ½ mol per mol of aluminum compound.

3. A process according to claim 1 wherein said lactone is beta-propiolactone of high purity, characterized by a refractive index of $n_D^{20}=1.4478$ and a gas-liquid chromatogram showing no contaminating impurities.

4. A process according to claim 2 wherein said lactone is beta-propiolactone of high purity, characterized by a refractive index of $n_D^{20}=1.4478$ and a gas-liquid chromatogram showing no contaminating impurities.

5. A process according to claim 1, wherein said lactone is delta-valerolactone of high purity, characterized by a refractive index of $n_D^{20}=1.4530$ and a gas-liquid chromatogram showing no contaminating impurities.

6. A process according to claim 2 wherein said lactone is delta-valerolactone of high purity, characterized by a refractive index of $n_D^{20}=1.4530$ and a gas-liquid chromatogram showing no contaminating impurities.

7. A process according to claim 1, wherein said lactone is epsilon-caprolactone of high purity, characterized by a refractive index of $n_D^{20}=1.4621$ and a gas-liquid chromatogram showing no contaminating impurities.

8. A process according to claim 2 wherein said lactone is epsilon-caprolactone of high purity, characterized by a refractive index of $n_D^{20}=1.4621$ and a gas-liquid chromatogram showing no contaminating impurities.

9. A process according to claim 3 wherein said organo-aluminum compound is aluminum triethyl and said amount of water is in the range from ½ to ⅔ mol per mol of aluminum triethyl.

10. A process according to claim 3, wherein said organo-aluminum compound is aluminum diethyl ethoxide and said amount of water is in the range from ½ to ⅔ mol per mol of aluminum diethyl ethoxide.

11. A process according to claim 4, wherein said organo-aluminum compound is aluminum diethyl chloride and said amount of water is in the range from ⅙ to ½ mol per mol of aluminum diethyl chloride.

12. A process according to claim 4, wherein said organo-aluminum compound is aluminum ethyl dichloride and said amount of water is in the range from ⅙ to ½ mol per mol of aluminum ethyl dichloride.

References Cited by the Examiner

UNITED STATES PATENTS

| | | | |
|---|---|---|---|
| 3,021,310 | 2/1962 | Cox et al. | 260—78.3 |
| 3,021,313 | 2/1962 | Cox et al. | 260—78.3 |
| 3,111,469 | 11/1963 | Marans | 260—78.3 |
| 3,190,858 | 6/1965 | Cox et al. | 260—78.3 |

JOSEPH L. SCHOFER, *Primary Examiner.*

L. WOLF, *Assistant Examiner.*